United States Patent [19]

Martin et al.

[11] Patent Number: 5,181,008
[45] Date of Patent: Jan. 19, 1993

[54] DIAMOND ENCAPSULATED RESISTANCE TEMPERATURE DETECTOR

[76] Inventors: Kevin B. Martin; Ralph G. Martin, both of P.O. Box 2321, Atascadero, Calif. 93423

[21] Appl. No.: 597,055

[22] Filed: Oct. 15, 1990

[51] Int. Cl.⁵ .......................... H01C 3/10; G01K 7/16
[52] U.S. Cl. ................................................ 338/28
[58] Field of Search ................... 374/185, 164, 165; 338/25, 28, 269; 174/16.3

[56] References Cited

U.S. PATENT DOCUMENTS

| | | | |
|---|---|---|---|
| 2,470,653 | 5/1949 | Schulman et al. | 374/185 X |
| 2,506,574 | 5/1950 | Boydstun | 338/269 X |
| 3,723,935 | 3/1973 | Frazier et al. | 338/28 |
| 3,830,105 | 8/1974 | Horsch | 338/28 X |
| 4,227,036 | 10/1980 | Fitzgerald | 174/16.3 |
| 4,369,656 | 1/1983 | Ueno et al. | 338/25 |
| 4,560,973 | 12/1985 | Grimm et al. | 374/185 X |
| 4,782,893 | 11/1988 | Thomas | 174/16.3 X |
| 4,790,182 | 12/1988 | Takahashi et al. | 338/25 X |
| 4,804,935 | 2/1989 | Hori et al. | 374/165 X |

Primary Examiner—Daniel M. Yasich
Attorney, Agent, or Firm—Burns, Doane, Swecker & Mathis

[57] ABSTRACT

A resistance temperature detector for rapidly sensing temperatures in an operating environment by means of changes in the current through an element whose electrical resistance varies with temperature includes a fine wire coil whose electrical resistance varies with temperature, and a deposited coating of a rigid, coherent mineral, such as diamond, which is deposited over the fine wire coil.

5 Claims, 2 Drawing Sheets

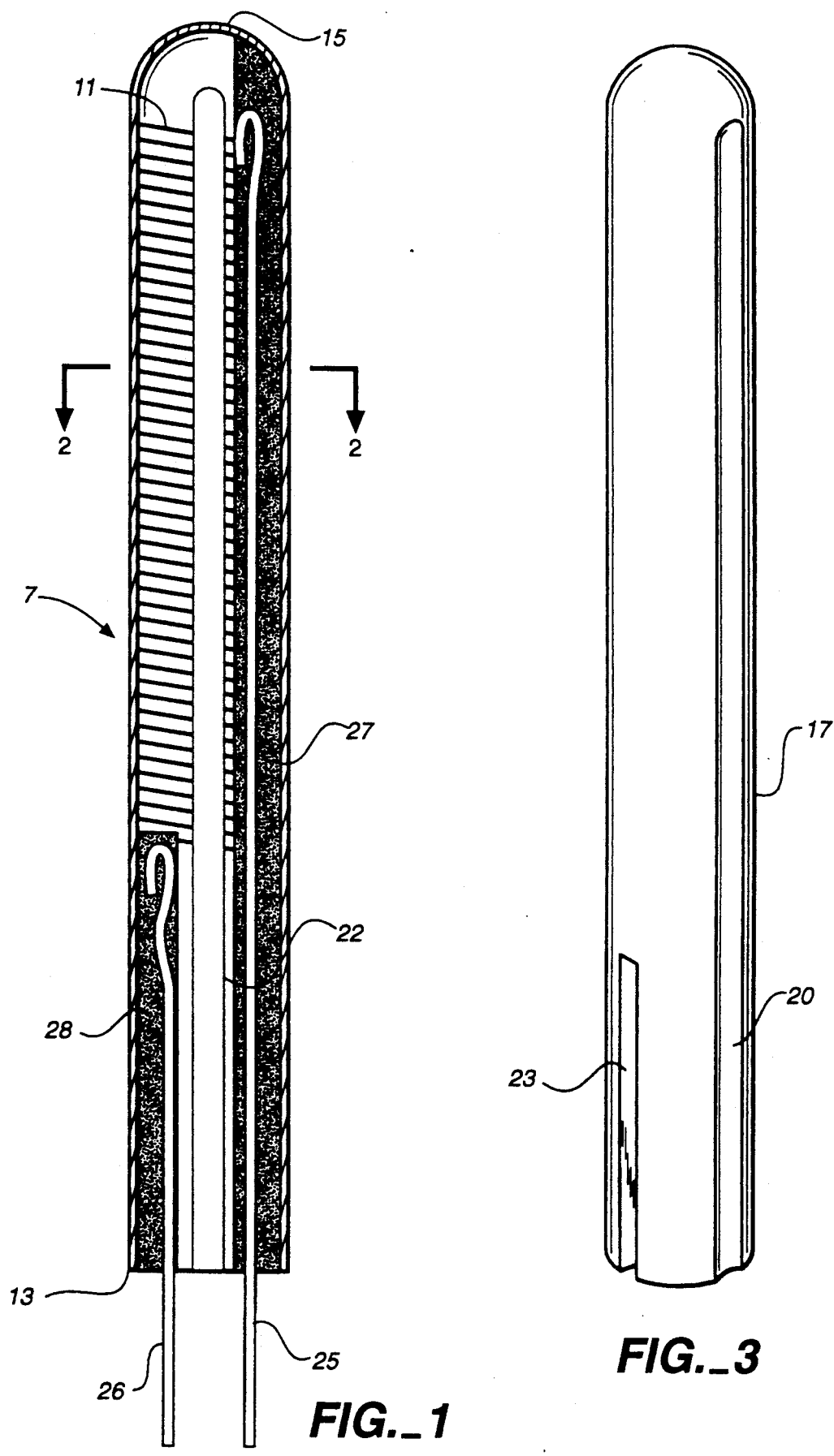

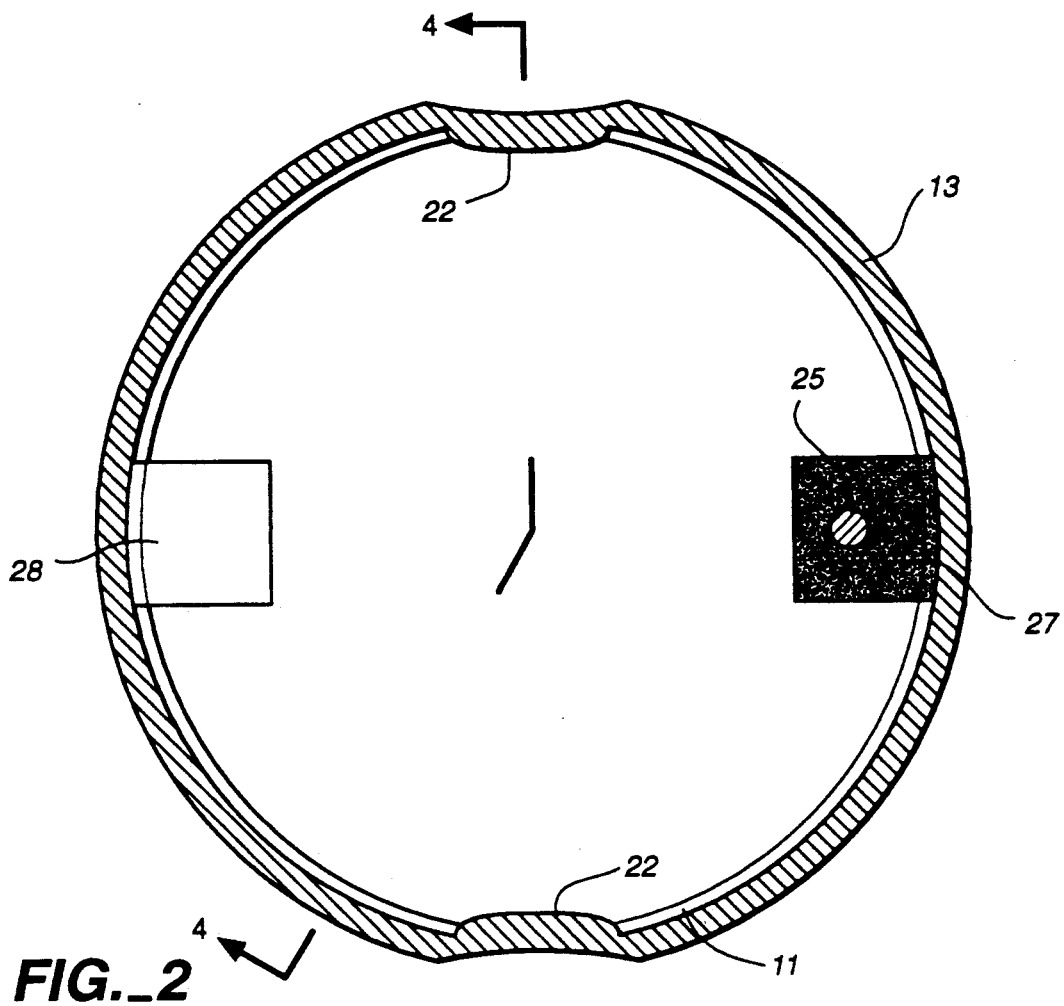
FIG._2
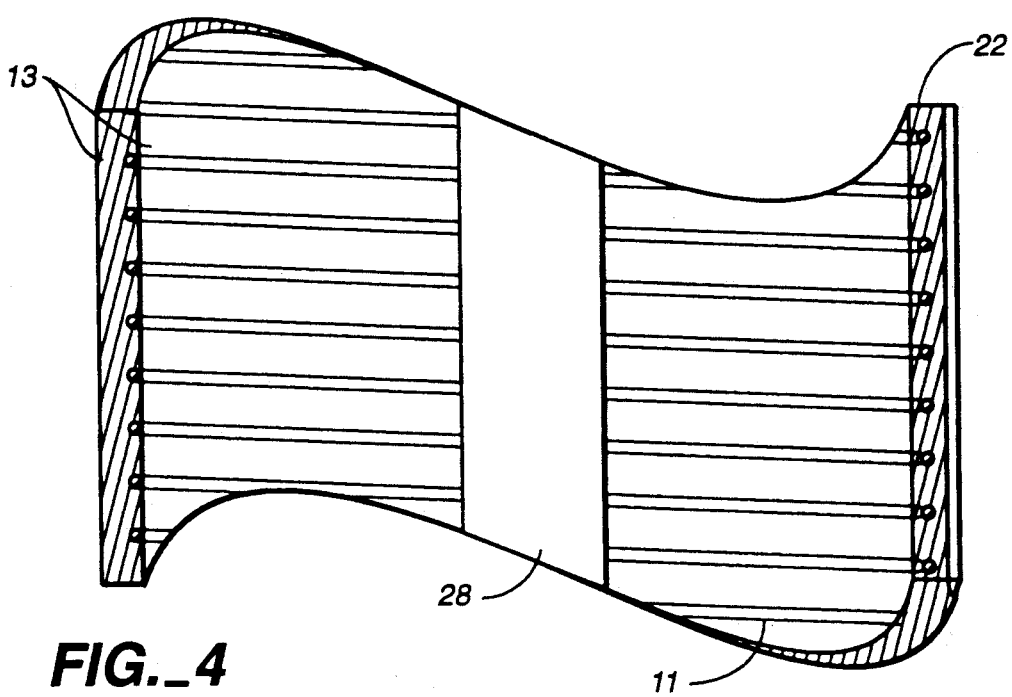
FIG._4

DIAMOND ENCAPSULATED RESISTANCE TEMPERATURE DETECTOR

BACKGROUND OF THE INVENTION

1. Field of the Invention

The present invention generally relates to resistance temperature detectors.

2. State of the Art

Resistance temperature detectors, or thermometers, are devices that sense temperature by means of changes in the magnitude of current through, or voltage across, an element whose electrical resistance varies with temperature. In many conventional resistance temperature detectors, the temperature-variable resistance element is fabricated from fine diameter wire (i.e., wires with diameters less than 50 um). Because of this construction, conventional resistance temperature detectors require substantial mechanical protection from chemical and-/or physical hazards in their operating environments. For example, an operating environment might range in temperature from cryogenic temperatures to temperatures exceeding 400° Centigrade.

Resistance temperature detectors are usually fabricated by winding a fine diameter wire on a bobbin or mandrel which, typically, is made of a ceramic material such as aluminum oxide (alumina). Then, the wire-wound bobbin is coated with an cement-like insulating material and is installed in a protective tube. In industrial applications, the protective tube is usually made of steel or a nickel alloy such as Monel. In some instances, the wire-wound mandrel is mounted in a ceramic tube for protection.

The above-described techniques for protecting resistance temperature detectors have the shortcoming that the temperature sensor in the temperature detector—the fine diameter resistance wire—is not only mechanically insulated but is also, to some extent, thermally removed from its operating environment by a relatively large mass. Generally speaking, the greater the mass of material separating the temperature sensor from its environment, or supporting the sensor in its environment, the slower is the response of the sensor to temperature changes. (Conventional resistance temperature detectors have a time constant of about 5 to 10 seconds in response to a step change in temperature in water flowing at 1 m/s.)

In practice, resistance temperature detectors have been constructed in various ways to reduce their thermal response times. For example, bobbin walls in resistance temperature detectors have been made very thin to minimize thermal mass and, accordingly, to decrease the time required for the temperature detector to reach equilibrium. As another example, protective housings have been made of materials that have very high thermal conductivity, such as silver alloys. Nevertheless, conventional resistance temperature detectors have thermal response times (i.e., time constants) that are too long for use in various applications and control systems, especially ones where response time is an issue because of safety concerns.

SUMMARY OF THE INVENTION

Generally speaking, the present invention provides a resistance temperature detector wherein a coil of fine wire is supported by a rigid, coherent mineral coating which is formed by chemical vapor deposition, or a similar method, over the wire wound on a bobbin. Preferably, the bobbin is sacrificial in the sense that, after the coating is applied, the bobbin can be easily destroyed by chemical or thermal methods, leaving only the element wire embedded in the hollow, capsule-like mineral coating.

In the preferred embodiment, the coating material is formed by chemical vapor deposition of diamond. Diamond has extremely high thermal conductivity—approximately five to ten times greater than copper—and is chemically inert over a wide range of temperatures. Other minerals for forming the coating can include titanium dioxide, zirconia, beryllium oxide, and aluminum oxide. The fine diameter wire preferably is be formed of balco, nickel, copper, or platinum.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a cross-sectional view of a resistance temperature detector according to the present invention;

FIG. 2 is a sectional view of the resistance temperature detector of FIG. 1, which section is taken along the lines 2—2;

FIG. 3 is a pictorial view of a substrate for use in constructing the resistance temperature detector of FIG. 1; and FIG. 4 is a cross-sectional detail of the resistance temperature detector, taken along the lines 4—4 in FIG. 2 and enlarged for purposes of clarity.

DETAILED DESCRIPTION OF THE PREFERRED EMBODIMENT

Generally speaking, FIG. 1 shows a completed resistance temperature detector, generally indicated by number 7, that includes a fine wire coil 11, or helix, which is embedded in a supportive coating 13. In the illustrated embodiment, the supportive coating 13 has a hollow cylindrical form with one closed end 15 which has a generally hemispherical shape after the removal of the substrate 17 as described below. Overall, resistance temperature detector 7 has a bullet-like profile, although other shapes can be designed. As will be described in further detail below, electrical connection to the coil 11 is provided, at one end of the coil, by lead wire 25 embedded in and insulated by a ceramic column 27 and, at the other end of the coil, by lead wire 26 embedded in and insulated by a ceramic column 28.

In practice, the preferred wire for forming wire coil 11 is platinum. As alternative examples, the fine diameter wire can be formed of Balco, nickel, or copper.

Preferably, resistance temperature detector 7 is fabricated by winding the wire coil 11 over a substrate bobbin such as generally indicated by the number 17 in FIG. 3. In practice, the substrate bobbin 17 is sacrificial in the sense that it can be easily destroyed by chemical or thermal methods. In the preferred embodiment, the substrate bobbin 17 is formed of molybdenum, but other suitable substrate materials include silica and silicon carbide. Generally speaking, the substrate material should be chosen to provide a suitable desposition surface for the coating 13 while also being susceptible to attack by chemicals that do not affect the other components of the resistance temperature detector 7.

Further, the fabrication process comprises covering the bobbin-supported coil 11 with a rigid, coherent mineral to form coating 13. In practice, coating 13 can be formed by chemical vapor deposition. Preferably, the coating material is diamond and is formed by chemical vapor deposition to a thickness of 125-250 um, or more. The reason for preferring diamond is that it has extremely high thermal conductivity—roughly five to ten times greater than copper—and is chemically inert over a wide range of temperatures. However, other suitable minerals for forming the coating 13 include titanium dioxide, zirconia, beryllium oxide, and aluminum oxide.

Still further, the fabrication process comprises the step of dissolving the substrate bobbin 17, leaving only wire coil 11 embedded in the hollow coating 13. In practice, when the substrate is molybdenum, the substrate bobbin 17 is dissolved in concentrated hydrogen peroxide at room temperature. Hydrogen peroxide has the advantage that it can dissolve molybdenum without oxidizing platinum or diamond.

With the fabrication process completed, the element wire is completely contained in and supported by a rugged, low-mass, high thermal diffusivity probe capsule which is chemically inert in most oxidizing and reducing environments. The above-described resistance temperature detector has an expected time constant between 15 ms and 1 second, with the variations being a function of size and the thickness of the diamond coating. It should be noted that, by combining mechanical support and chemical protection in one probe structure, the mass of the structure is reduced.

As shown in the drawings, particularly in FIG. 2, ribs 22 can be formed in the deposited coat for mechanically supporting the fine wire coil 11. In practice, the ribs are formed by depositing the supportive coating in undercuts 20 (only one of which is visible in FIG. 3) which are formed in the substrate bobbin 17 (FIG. 3). The undercuts can extend, for example, to a depth equal to about one-half the expected coating thickness. The undercut areas provide sites where the supportive coating 13 can encase the coil wire 11 as shown in FIG. 4 and, hence, mechanically support the wire in a rib formed in the deposited coat.

As also shown in FIG. 3, slots 23 (only one of which is visible in FIG. 3) and 24 are cut the outer surface of the substrate bobbin for receiving a pair lead wires 25 and 26, respectively. More particularly, in the fabrication process, the two lead wires 25 and 26 are installed in respective ones of the slots and then are cemented into pl using, for example, an, oxidation-resistant cement. Then, one end of coil wire 11 is welded near end of the lead wire 25 and the coil wire is wound as a helix around the substrate bobbin 17. Finally, the other end of the coil wire is similar welded near the end of the other lead wire 26 of the pair. The ceramic cement columns that hold the two lead wires 25 and 26 are indicated in the drawings by the numbers 27 and 28, respectively.

The resistance temperature detector has a number of uses. For example, the resistance temperature detector can be used as a temperature sensor, or probe, in process control systems and in flow sensing systems such as aircraft fuel management systems. Also, it should be understood that the above-described device can be modified to operate as a heating element rather than as a temperature detector. In that event, the wire 11 is preferably made of nichrome, inconel, or a similar material.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A resistance temperature probe allowing for rapid sensing of temperatures by means of an element whose electrical resistance varies with temperature, comprising:
    a. coil means formed of a fine wire coil, the fine wire having the characteristic that its electrical resistance varies with temperature; and
    b. a deposited protective coating of diamond which is deposited over the fine wire coil, encasing the fine wire coil, the deposited protective coating of diamond being in direct thermal proximity to the environment.

2. A resistance temperature detector according to claim 1 wherein the wire of the fine wire coil is platinum.

3. A resistance temperature detector according to claim 1 wherein the wire of the fine wire coil is selected from the group comprising Balco, nickel, and copper.

4. A resistance temperature probe allowing for rapid sensing of temperatures, comprising:
    a. coil means formed of a fine wire coil whose electrical resistance varies with temperature; and
    b. a protective coating of diamond over the fine wire coil, the protective coating of diamond being in direct thermal contact with its environment.

5. A resistance temperature probe allowing for rapid sensing of temperatures, comprising:
    a. coil means formed of a fine wire coil whose electrical resistance varies with temperature;
    b. a protective coating of diamond formed so as to encrust and encase the wire coil to mechanically support the wire coil, the protective coating of diamond being in direct thermal contact with its environment.

* * * * *